United States Patent [19]

Suyama et al.

[11] Patent Number: 4,954,656

[45] Date of Patent: Sep. 4, 1990

[54] ESTER-TYPE POLYMERIC PEROXIDES

[75] Inventors: Shuji Suyama; Yoshiki Higuchi, both of Chita, Japan

[73] Assignee: Nippon Oil and Fats Company, Limited, Tokyo, Japan

[21] Appl. No.: 480,037

[22] Filed: Feb. 14, 1990

[30] Foreign Application Priority Data

Feb. 22, 1989 [JP] Japan .................................. 1-40394

[51] Int. Cl.$^5$ ............................................ C07C 179/18
[52] U.S. Cl. .................................................. 568/567
[58] Field of Search ......................................... 568/567

[56] References Cited

U.S. PATENT DOCUMENTS 3,822,317 7/1974 D'Angelo et al. .................. 568/567

Primary Examiner—John M. Ford
Assistant Examiner—Robert C. Whittenbaugh
Attorney, Agent, or Firm—Stevens, Davis, Miller & Mosher

[57] ABSTRACT

A novel polymeric peroxide used as a free radical polymerization initiator for vinyl monomers is a compound alternately bonding the two particular structural units in random form and having two different thermal decomposition rates.

1 Claim, No Drawings

ESTER-TYPE POLYMERIC PEROXIDES

BACKGROUND OF THE INVENTION

1. Field of the Invention

This invention relates to novel polymeric peroxides used as a free radical polymerization initiator for vinyl monomers and having two peroxy groups of different thermal decomposition rates.

2. Related Art Statement

As a polymeric peroxide having two or more peroxy groups in one molecule, there have hitherto been known peroxides in which these peroxy groups have the same thermal decomposition rate, and peroxides in which the peroxy groups have different thermal decomposition rates. As the former polymeric peroxide, there are reported a diacyl-type polymeric peroxide obtained by reaction between phthalic chloride and sodium peroxide in Berichte der Deutschen Chemischen Gesellschaft (Ber.), vol. 27, page 1510 (1984), a diacyl-type polymeric peroxide obtained by reaction between oxalic chloride and sodium peroxide in Journal of the American Chemical Society (J. Am. Chem. Soc.), vol 68, page 534 (1946), and diacyl-type polymeric peroxides of the following general formula:

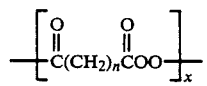

(wherein n is 2–10 and x is 16–35) obtained by reaction between a chloride of aliphatic dibasic acid and sodium peroxide in Chemical Abstracts (Chem. Abst.), vol. 60, 5293d and 10892e (1964).

As the latter polymeric peroxide, there are reported polymeric peroxide obtained by reaction between a substituted succinic acid and p-diisopropyl benzene dihydroperoxide in Journal of Organic Chemistry in USSR (J. Org. Chem. USSR), vol. 13, No. 1, page 210 (1977), and polymeric peroxide obtained by alternately bonding the following groups:

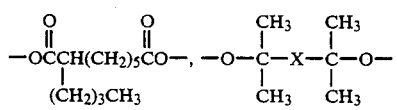

(where X is —CH$_2$CH$_2$— group or —C≡C— group) in Japanese Patent laid open No. 59-8727.

As mentioned above, there are known several polymeric peroxides, among which the known ester-type polymeric peroxides having different thermal decomposition rates contain primary acyl group

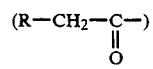

and secondary acyl group

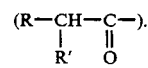

Therefore, when such a polymeric peroxide is used as a polymerization initiator, it is decomposed at one stage and the polymerization temperature is restricted to a range of 50° C. to 130° C. On the other hand, there is known no polymeric peroxide as an initiator decomposed at two stages and used at a polymerization temperature of 40°–90° C. However, it may be desired to decompose two kinds of peroxy bonds in the polymeric peroxide at a relatively low temperature in accordance with the monomer to be polymerized. Recently, it is strongly demanded to develop polymeric peroxides satisfying such a requirement.

SUMMARY OF THE INVENTION

It is, therefore, an object of the invention to provide novel ester-type polymeric peroxides capable of using at a relatively low polymerization temperature and decomposing at two stages.

According to the invention, there is the provision of a polymeric peroxide consisting of a combination of structural unit represented by the following general formula (I) and structural unit represented by the following general formula (II):

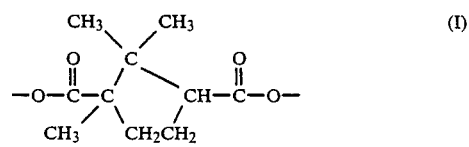

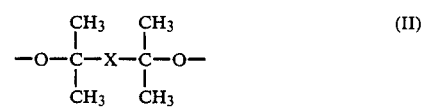

(where X is —CH$_2$CH$_2$— group, —C≡C— group or

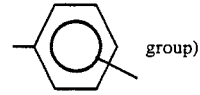

group)

and having an average molecular weight of 2000–20000, in which said structural units I and II are randomly bonded in form of head-to-head and head-to-tail bonds and a mol ratio of structural unit I to structural unit II is 6:4–4:6.

DESCRIPTION OF THE PREFERRED EMBODIMENTS

The ester-type polymeric peroxide according to the invention can be produced by reacting an acid chloride represented by the following general formula:

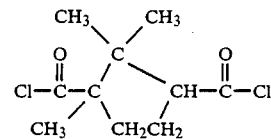

with a hydroperoxide represented by the following general formula:

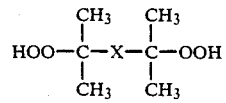

(where X is —CH$_2$CH$_2$— group,

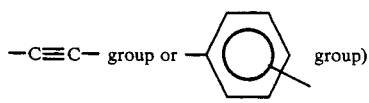

in the presence of an alkali.

The mol ratio of acid chloride to hydroperoxide is preferable to be within a range of 6:4 to 4:6. When the mol ratio is outside the above range, the yield of the resulting polymeric peroxide undesirably lowers. The alkali used in the above reaction includes amines such as pyridine and the like, and inorganic salts such as potassium hydroxide, sodium hydroxide and the like or aqueous solution thereof. Furthermore, a solvent such as benzene, toluene, ether or the like may be used in this reaction. Moreover, the reaction conditions are the same as the in the production of ordinary peroxy ester, in which the reaction temperature is −20° C.−+40° C., preferably 0°–20° C. and the reaction time is 0.25–10 hours, preferably 1–3 hours.

Since the ester-type polymeric peroxide according to the invention is obtained by dehydrochlorination-condensation-peresterification reaction between acid chloride and hydroperoxide as mentioned above, it is easily understood that this polymeric peroxide is a compound alternately bonding the structural unit I and the structural unit II. Furthermore, since the structure of the acid chloride is bilaterally unsymmetrical, it is easily understood that the bonding form between the structural unit I and the structural unit II is head-to-head and head-to-tail random bonds. Moreover, the terminal group of the peroxide is either carboxyl group or hydroperoxy group judging from the starting material used.

The molecular weight of the ester-type polymeric peroxide according to the invention changes in accordance with the mol ratio of the starting materials used and the reaction conditions. If the starting materials are used in equimolar amounts and reacted for a long time, the molecular weight becomes theoretically infinite, but it is in fact critical due to secondary reaction and the like. When the reaction conditions are within the above defined ranges, the average molecular weight is 2000–20000.

In the above produced ester-type polymeric peroxide according to the invention, C=O bond of ester and O—O bond of peroxide are confirmed by an infrared ray absorption spectrum, and the chemical structure is determined by a nuclear magnetic resonance spectrum. Further, the average molecular weight is measured by VPO process (using a molecular weight measuring device of 117 Model made by Corona Denki K.K.). Moreover, the potential amount of peroxy group can be determined from active oxygen amount, and the thermal decomposition behavior can be known from thermal decomposition rate.

The ester-type polymeric peroxide according to the invention has two acyl-type secondary and tertiary peroxy groups, in which a temperature for decomposing the peroxy group to a half in 10 hours (hereinafter referred to as 10 hour half-life temperature) is 50°–55° C. at a low temperature side and 72°–78° C. at a high temperature side, and is useful as an initiator for block copolymers based on vinyl chloride, (metha)acrylic acid or ester thereof. The ester-type polymeric peroxide according to the invention can be used as a polymerization initiator in the production of, for example, a block copolymer between vinyl chloride and (metha)acrylic acid or its ester, block copolymer between vinyl chloride and styrene, block copolymer between vinyl chloride and maleimide, block copolymer between (metha)acrylic acid or its ester and styrene, and so on.

Furthermore, the ester-type polymeric peroxide according to the invention is useful as a polymerization initiator in the polymerization of vinyl chloride, (metha)acrylic acid or its ester, styrene or ethylene. Particularly, in case of the polymerization of vinyl chloride, it is generally necessary to hold the reaction vessel at a constant polymerization heat over the polymerization period. Therefore, the polymerization rate should be constant. For this purpose, the polymerization is usually carried out by using an initiator of low temperture activity (immediate effectiveness) together with an initiator of high temperature activity (slow effectiveness). On the other hand, since the initiator according to the invention possesses both functions of low temperature activity and high temperature activity, the uniform polymerization rate can be obtained by using the initiator according to the invention alone. In the polymerization of ethylene, it is generally desirable that the organic peroxide is wide in the temperature region indicating a minimum consumption amount of the initiator or small in the temperature dependency of polymerization efficiency, whereby the initiator can be used over a wide temperature range. In this connection, it is advantageous to use the organic peroxide having different decomposition temperatures as in the invention.

The following examples are given in illustration of the invention and are not intended as limitations thereof.

EXAMPLE 1

Into a four-neck flask of 200 ml provided with a stirrer and a thermometer were charged 17.8 g (0.1 mol) of 2,5-dimethyl-2,5-dihydroperoxy hexane (hereinafter abbreviated as 2,5H) and 30 g of water, which were cooled in ice and added with 29.2 g (0.25 mol) of 48% KOH with stirring. Then, a mixed solution of 23.7 g (0.1 mol) of camphoric acid dichloride (hereinafter abbreviated as CDC) and 30 ml of toluene was added dropwise over 30 minutes and the reaction was further continued for 2 hours. After the completion of the reaction, 50 ml of ether was added, which was then washed with a 10% aqueous solution of NaOH and further with water, dried on magnesium sulfate and concentrated under a reduced pressure below 20° C. to obtain 29.1 g of a viscous liquid. The yield based on CDC was 85%.

The active oxygen amount of the thus obtained viscous liquid was 8.73% as measured by usual iodo titration method.

Furthermore, the characteristic absorption of the viscous liquid through the infrared ray absorption spectrum is 1775 cm$^{-1}$ (C=O bond) and 860 cm$^{-1}$ (O—O bond), and the chemical shift value δ and strength of proton through the nuclear magnetic resonance spectrum are

| | | |
|---|---|---|
| ⓐ | 3H× 3 | 0.96, 1.08, 1.14 ppm |
| ⓑ | 12H | 1.20 ppm |
| ⓒ | 8H | 1.74 ppm |
| ⓓ | 1H | 2.58 ppm, | from which it has been confirmed that the viscous liquid is a polymeric peroxide consisting of the following structural formulae I and IIa:

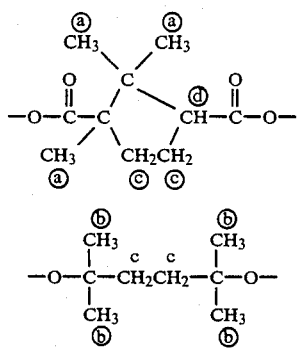

Then, the average molecular weight of the polymeric peroxide was measured by means of VPO (molecular weight measuring device of Model 117 made by Corona Denki K.K.) to be 18500.

After the polymeric peroxide was dissolved in cumene (0.05 mol/l cumene solution), the thermal decomposition rate constant and 10 hour half-life temperature based on two peroxy groups in molecule were measured from 50° C. to 80° C. every 10° C. The results are shown in the following Table 1.

TABLE 1

| Temperature (°C.) | $kd_1$ *1 $(hr^{-1})$ | $kd_2$ *2 $(hr^{-1})$ |
| --- | --- | --- |
| 50 | 0.033 | 0.00105 |
| 60 | 0.161 | 0.0057 |
| 70 | 0.72 | 0.028 |
| 80 | 2.95 | 0.125 |
| 10 hour half-life temperature (°C.) | 54.6 | 76.1 |

*1 $kd_1$: Thermal decomposition rate constant based on peroxy group decomposed at low temperature side
*2 $kd_2$: Thermal decomposition rate constant based on peroxy group decomposed at high temperature side

EXAMPLES 2 and 3

The same procedure as in Example 1 was repeated except that the charging ratio of 2,5H to CDC was 6:4 or 4:6 to obtain a viscous liquid. The yield of the thus obtained viscous liquid is shown in the following Table 2. Moreover, the active oxygen amount and average molecular weight were measured by the same method as in Example 1 to obtain results as shown in Table 2. It has been confirmed from the results of the infrared ray absorption spectrum and nuclear magnetic resonance spectrum that the viscous liquid is a polymeric peroxide consisting of the structural units I and IIa likewise Example 1.

TABLE 2

| Example | Amount of starting material used (mol) 2,5H | Amount of starting material used (mol) CDC | Active oxygen amount (%) | Yield (g) | Yield (%) | Average molecular weight |
| --- | --- | --- | --- | --- | --- | --- |
| 2 | 0.08 | 0.12 | 8.46 | 23.8 | 87 *1 | 3900 |
| 3 | 0.12 | 0.08 | 8.81 | 23.0 | 84 *2 | 3100 |

*1 yield based on 2,5H
*2 yield based on CDC

EXAMPLE 4

The same procedure as in Example 1 was repeated except that 17.4 g (0.1 mol) of 2,5-dimethyl-2,5-dihydroperoxyhexan-3-yne (hereinafter abbreviated as 2,5HY) was used instead of 2,5-dimethyl-2,5-dihydroperoxy hexane (2,5H) to obtain 28.4 g of a viscous liquid. The yield based on CDC was 84%. The active oxygen amount of the viscous liquid was measured by usual iodo titration method to be 8.60%.

The characteristic absorption of the viscous liquid through the infrared ray absorption spectrum was 1775 $cm^{-1}$ (C=O bond) and 860 $cm^{-1}$ (O—O bond), and the chemical shift value δ and strength of proton through the nuclear magnetic resonance spectrum were

| ⓐ | 3H × 3 | 0.96, 1.08, 1.14 ppm |
| --- | --- | --- |
| ⓑ | 12H | 1.56 ppm |
| ⓒ | 4H | 1.74 ppm |
| ⓓ | 1H | 2.58 ppm, | from which it has been confirmed that the viscous liquid is a polymeric peroxide consisting of the following structural units I and IIb:

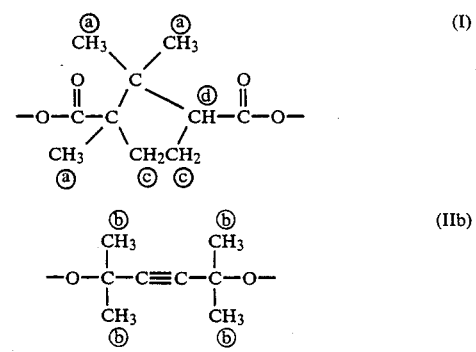

Then, the average molecular weight of the polymeric peroxide was measured by the same method as in Example 1 to be 11500.

Further, the thermal decomposition rate constant and 10 hour half-life temperature of the polymeric peroxide were measured by the same method as in Example 1. The results are shown in the following Table 3.

TABLE 3

| Temperature (°C.) | $kd_1$ *1 $(hr^{-1})$ | $kd_2$ *2 $(hr^{-1})$ |
| --- | --- | --- |
| 50 | 0.042 | 0.00086 |
| 60 | 0.201 | 0.0046 |
| 70 | 0.902 | 0.023 |
| 80 | 3.64 | 0.10 |
| 10 hour half-life temperature (°C.) | 53.2 | 77.4 |

*1 $kd_1$: Thermal decomposition rate constant based on peroxy group decomposed at low temperature side
*2 $kd_2$: Thermal decomposition rate constant based on peroxy group decomposed at high temperature side

EXAMPLES 5 and 6

The same procedure as in Example 1 was repeated except that the charging ratio of 2,5HY to CDC was 6:4 or 4:6 to obtain a viscous liquid. The yield of the thus obtained viscous liquid is shown in the following Table 4. Moreover, the active oxygen amount and average molecular weight were measured by the same method as in Example 1 to obtain results as shown in Table 4. It has been confirmed from the results of the infrared ray absorption spectrum and nuclear magnetic resonance spectrum that the viscous liquid is a polymeric peroxide consisting of the structural units I and IIb likewise Example 4.

TABLE 4

| Example | Amount of starting material used (mol) | | Active oxygen amount (%) | Yield | | Average molecular weight |
|---|---|---|---|---|---|---|
| | 2,5HY | CDC | | (g) | (%) | |
| 5 | 0.08 | 0.12 | 8.50 | 22.5 | 83 *1 | 3100 |
| 6 | 0.12 | 0.08 | 8.71 | 21.4 | 79 *2 | 2500 |

*1 yield based on 2,5HY
*2 yield based on CDC

EXAMPLE 7

The same procedure as in Example 1 was repeated except that 39.0 g (0.1 mol) of diisopropyl benzene dihydroperoxide (hereinafter abbreviated as DHP) was used instead of 2,5-dimethyl-2,5-dihydroperoxy hexane (2,5H) to obtain 31.2 g of a viscous liquid. The yield based on CDC was 80%. The active oxygen amount of the viscous liquid was measured by usual iodo titration method to be 7.43%.

The characteristic absorption of the viscous liquid through the infrared ray absorption spectrum was 1780 cm$^{-1}$ (C=O bond) and 860 cm$^{-1}$ (O—O bond), and the chemical shift value δ and strength of proton through the nuclear magnetic resonance spectrum were

| ⓐ | 3H× 3 | 0.96, 1.08, 1.14 ppm |
| ⓑ | 12H | 1.67 ppm |
| ⓒ | 4H | 1.74 ppm |
| ⓓ | 1H | 2.58 ppm |
| ⓔ | 4H | 7.5 ppm, | from which it has been confirmed that the viscous liquid is a polymeric peroxide consisting of the following structural units I and IIc:

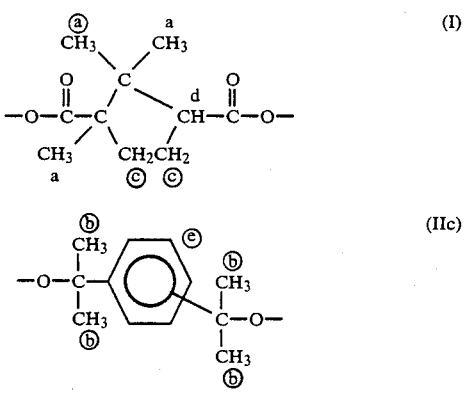

Then, the average molecular weight of the polymeric peroxide was measured by the same method as in Example 1 to be 15500.

Further, the thermal decomposition rate constant and 10 hour half-life temperature of the polymeric peroxide were measured by the same method as in Example 1. The results are shown in the following Table 5.

TABLE 5

| Temperature (°C.) | kd$_1$ *1 (hr$^{-1}$) | kd$_2$ *2 (hr$^{-1}$) |
|---|---|---|
| 50 | 0.064 | 0.0015 |
| 60 | 0.31 | 0.0088 |
| 70 | 1.4 | 0.044 |
| 80 | 5.8 | 0.80 |
| 10 hour half-life temperature (°C.) | 50.6 | 72.1 |

*1 kd$_1$: Thermal decomposition rate constant based on peroxy group decomposed at low temperature side
*2 kd$_2$: Thermal decomposition rate constant based on peroxy group decomposed at high temperature side

EXAMPLES 8 and 9

The same procedure as in Example 1 was repeated except that the charging ratio of DHP to CDC was 6:4 or 4:6 to obtain a viscous liquid. The yield of the thus obtained viscous liquid is shown in the following Table 6. Moreover, the active oxygen amount and average molecular weight were measured by the same method as in Example 1 to obtain results as shown in Table 6. It has been confirmed from the results of the infrared ray absorption spectrum and nuclear magnetic resonance spectrum that the viscous liquid is a polymeric peroxide consisting of the structural units I and IIc likewise Example 7.

TABLE 6

| Example | Amount of starting material used (mol) | | Active oxygen amount (%) | Yield | | Average molecular weight |
|---|---|---|---|---|---|---|
| | DHP | CDC | | (g) | (%) | |
| 8 | 0.08 | 0.12 | 7.32 | 25.6 | 82 *1 | 3800 |
| 9 | 0.12 | 0.08 | 7.68 | 24.7 | 79 *2 | 3200 |

*1 yield based on DHP
*2 yield based on CDC

What is claimed is:

1. A polymeric peroxide consisting of a combination of structural unit represented by the following general formula (I) and structural unit represented by the following general formula (II):

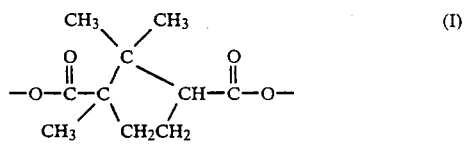

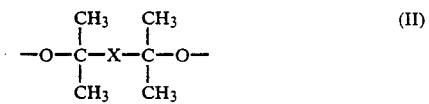

(where X is —CH$_2$CH$_2$— group, —C≡C— group or

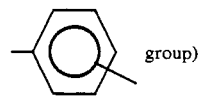

group)

and having an average molecular weight of 2000–20000, in which said structural units I and II are randomly bonded in form of head-to-head and head-to-tail bonds and a mol ratio of structural unit I to structural unit II is 6:4–4:6.

* * * * *